United States Patent
Kambara et al.

(10) Patent No.: US 11,916,191 B2
(45) Date of Patent: Feb. 27, 2024

(54) METHOD FOR PRODUCING SULFIDE SOLID ELECTROLYTE HAVING ARGYRODITE-TYPE CRYSTAL STRUCTURE

(71) Applicant: IDEMITSU KOSAN CO., LTD., Chiyoda-ku (JP)

(72) Inventors: Takayoshi Kambara, Sodegaura (JP); Minoru Senga, Sodegaura (JP); Katsuhito Kondo, Sodegaura (JP); Naoya Masuda, Sodegaura (JP); Hironari Kimpara, Sodegaura (JP); Futoshi Utsuno, Sodegaura (JP); Hiroyuki Tamura, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 819 days.

(21) Appl. No.: 16/976,976

(22) PCT Filed: Mar. 1, 2019

(86) PCT No.: PCT/JP2019/008019
§ 371 (c)(1),
(2) Date: Aug. 31, 2020

(87) PCT Pub. No.: WO2019/172106
PCT Pub. Date: Sep. 12, 2019

(65) Prior Publication Data
US 2021/0005924 A1 Jan. 7, 2021

(30) Foreign Application Priority Data
Mar. 5, 2018 (JP) ................ 2018-038750

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/30* (2013.01);
(Continued)

(58) Field of Classification Search
CPC ..... H01M 10/0562; H01M 2300/0068; H01M 10/052; C01B 25/14; C01P 2002/30;
(Continued)

(56) References Cited

U.S. PATENT DOCUMENTS

2005/0107239 A1* 5/2005 Akiba ............... H01B 1/122
252/500
2010/0290969 A1 11/2010 Deiseroth et al.
2013/0288134 A1 10/2013 Hama et al.
2016/0156064 A1 6/2016 Miyashita et al.

FOREIGN PATENT DOCUMENTS

CN 105098230 A 11/2015
JP 2003-208919 A 7/2003
(Continued)

OTHER PUBLICATIONS

Rayavarapu et al. "Variation in structure and Li+-ion migration in argyrodite-type Li6PS5X (X=Cl, Br, I) solid electrolytes", J Solid State Electrochem (2012) 16:p. 1807-1813 (Year: 2012).*
(Continued)

*Primary Examiner* — Anthony J Zimmer
*Assistant Examiner* — Syed T Iqbal
(74) *Attorney, Agent, or Firm* — Oblon, McClelland, Maier & Neustadt, L.L.P.

(57) ABSTRACT

A method for producing a sulfide solid electrolyte having an argyrodite-type crystal structure may involve: mixing a raw material containing elemental phosphorus at an integrated power of 0.5 kWh/kg or more, and heat-treating a precursor obtained in the mixing at 350 to 500° C.

18 Claims, 2 Drawing Sheets

(52) U.S. Cl.
CPC ...... *C01P 2002/72* (2013.01); *C01P 2002/86* (2013.01); *C01P 2006/40* (2013.01); *H01M 2300/0068* (2013.01)

(58) Field of Classification Search
CPC .............. C01P 2002/72; C01P 2002/86; C01P 2006/40; H01B 1/06; H01B 1/10; H01B 13/00
See application file for complete search history.

(56) References Cited

FOREIGN PATENT DOCUMENTS

| | | |
|---|---|---|
| JP | 2010-540396 A | 12/2010 |
| JP | 2018-206774 A | 12/2018 |
| WO | WO 03/059810 A1 | 7/2003 |
| WO | WO 2012/017544 A1 | 2/2012 |
| WO | WO 2015/012042 A1 | 1/2015 |

OTHER PUBLICATIONS

International Search Report dated Apr. 23, 2019 in PCT/JP2019/008019, 1 page.
International Preliminary Report on Patentability and Written Opinion dated Sep. 17, 2020 in PCT/JP2019/008019 (submitting English translation only), 9 pages.
Combined Chinese Office Action and Search Report dated Nov. 17, 2021 in Patent Application No. 201980015924.X (with English translation of Category of Cited Documents), 7 pages.

\* cited by examiner

METHOD FOR PRODUCING SULFIDE SOLID ELECTROLYTE HAVING ARGYRODITE-TYPE CRYSTAL STRUCTURE

TECHNICAL FIELD

The present invention relates to a method for producing a sulfide solid electrolyte having an argyrodite-type crystal structure.

BACKGROUND ART

The development of batteries is important as a power source for information-related equipment, communication equipment, automobiles, etc. Among them, a lithium-ion battery has attracted an attention in terms of its high energy-density.

A liquid electrolyte containing a flammable organic solvent is used in conventional lithium-ion batteries currently on the market. On the other hand, a lithium-ion battery in which the battery is fully solidified by using solid electrolyte instead of liquid electrolyte (all-solid lithium-ion battery) has been developed. An all-solid lithium-ion battery does not use a flammable organic solvent therein, and therefore allows simplification of a safety device, and is considered advantageous in terms of producing cost and productivity.

A sulfide solid electrolyte is known as a solid electrolyte used in a lithium-ion battery (for example, see Patent Documents 1 to 4.). A sulfide solid electrolyte having an argyrodite-type crystal structure (hereinafter sometimes referred to as argyrodite-type solid electrolyte), which is a kind of solid electrolyte, is stable over a wide temperature range, and thus is expected to expand the use temperature range of a battery.

As a method for producing argyrodite-type solid electrolyte, for example, Patent Document 1 describes a method in which a raw material containing lithium sulfide and diphosphorus pentasulfide, and lithium chloride or lithium bromide is mixed by a ball mill and then subjected to heat treatment.

In addition, Patent Document 2 describes a method in which a raw material containing lithium sulfide and diphosphorus pentasulfide is heated at 550° C. for 6 days, and then gradually cooled.

RELATED ART DOCUMENTS

Patent Documents

[Patent Document 1] WO 2015/012042
[Patent Document 2] JP 2010-540396 A
[Patent Document 3] JP 2003-208919 A
[Patent Document 4] WO 2012/017544

SUMMARY OF THE INVENTION

As described in Patent Documents 1 and 2, diphosphorus pentasulfide is used as a raw material for a sulfide solid electrolyte. However, diphosphorus pentasulfide is unstable against moisture, and therefore requires careful handling during transportation, storage, and the like.

Thus, the present inventors have studied the production of argyrodite-type solid electrolyte using a single substance of phosphorus (elemental phosphorus) instead of diphosphorus pentasulfide. As described in Patent Documents 3 and 4, although there has been an example in which a solid electrolyte is produced using elemental phosphorus, a solid electrolyte having high ionic conductivity cannot be obtained. As a result of studies by the present inventors, it has been found that when elemental phosphorus is used, there is a problem that the ionic conductivity becomes low even in an argyrodite-type solid electrolyte.

It is an object of the invention to provide a method for producing in which elemental phosphorus is used as a raw material and an argyrodite-type solid electrolyte having high ionic conductivity is obtained.

One aspect of the invention provides a method for producing a sulfide solid electrolyte having an argyrodite-type crystal structure, which comprises mixing a raw material containing elemental phosphorus at an integrated power of 0.5 kwh/kg or more, and heat-treating the precursor obtained in the mixing at 350 to 500° C.

In addition, one aspect of the invention provides a method for producing a sulfide solid electrolyte having an argyrodite-type crystal structure, which comprises mixing a raw material containing elemental phosphorus to obtain a precursor containing $P_2S_6^{4-}$ glass, and heat-treating the precursor at 350 to 500° C.

According to an aspect of the invention, it is possible to provide a method for producing in which elemental phosphorus is used as a raw material and an argyrodite-type solid electrolyte having high ionic conductivity is obtained.

MODE FOR CARRYING OUT THE INVENTION

Figure 1:
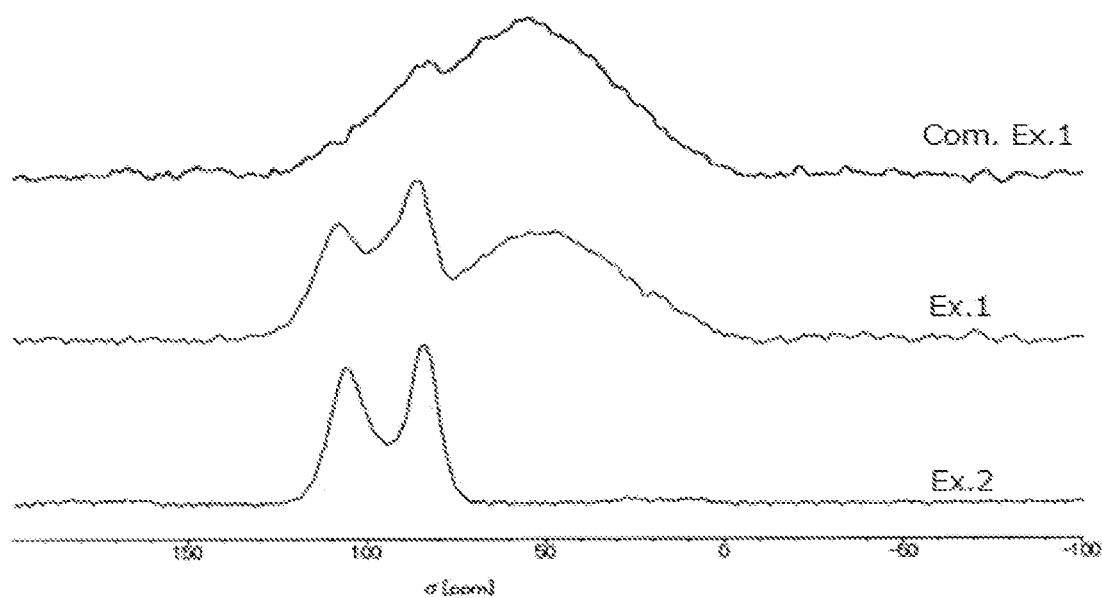
FIG. 1 shows the solid $^{31}$P-NMR spectra of the precursors obtained in Examples 1, 2 and Comparative Example 1.

A method for producing an argyrodite-type solid electrolyte of one aspect of the invention is characterized in that a raw material containing elemental phosphorus is mixed at an integrated power of 0.5 kwh/kg or more, and a precursor obtained by the mixing is heat-treated at 350 to 500° C. By crystallizing the precursor obtained by mixing at a predetermined energy amount or more with heat treatment, the ionic conductivity of the finally produced argyrodite-type solid electrolyte is increased.

Since the temperature at which an argyrodite-type solid electrolyte is crystallized is relatively high, evaporation and sublimation of the raw material cause compositional deviation. The boiling point of diphosphorus pentasulfide is about 515° C., and for example, in JP 2010-540396 A, evaporation and sublimation are suppressed by enclosing in a quartz tube and heat-treating at 550° C.

In contrast, when elemental phosphorus is used, since the sublimation start temperature of elemental phosphorus is around 430° C., the compositional deviation tends to occur more easily. In particular, for a solid electrolyte having an ionic conductivity of more than 7 mS/cm, a slight compositional deviation greatly affects the ionic conductivity. It has been found that, in a solid electrolyte having a high ionic conductivity, when elemental phosphorus is used as a starting material, even if heat treatment is performed in a sealed system, a composition distribution occurs in the treating material, and as a result, there is a problem that the ionic conductivity decreases. In this aspect, by mixing with a predetermined integrated power and reacting a raw material such as elemental phosphorus to form a precursor, it is possible to suppress a compositional deviation in a subsequent heat treatment at a high temperature. Since a desired precursor is obtained with a relatively small integrated power compared with when diphosphorus pentasulfide is used, an argyrodite-type solid electrolyte having high ionic conductivity can be easily obtained.

In the method for producing of this aspect, a raw material containing elemental phosphorus is used. Examples of the elemental phosphorus include yellow phosphorus, red phosphorus, and the like.

The compound or the single substance other than the elemental phosphorus constituting the raw material can be appropriately selected to obtain an argyrodite-type solid electrolyte having a desired elemental composition. Examples of the composition of the argyrodite-type solid electrolyte include a composition disclosed in Patent Document 1 or 2 or the like. Examples of the composition formula include $Li_6PS_5X$, $Li_{7-x}PS_{6-x}X_x$ (X=Cl, Br, I, x=0.0 to 1.8), and the like. In the above examples, a compound containing a lithium element, a sulfur element and optionally an element such as a halogen element as a constituent element, or a single substance can be used.

Examples of the compound containing lithium include, for example, lithium sulfide ($Li_2S$), lithium oxide ($Li_2O$), and lithium carbonate ($Li_2CO_3$). Among them, a lithium compound is preferable, and lithium sulfide is more preferable.

The lithium sulfide can be used without any particular limitation, but a lithium sulfide having a high purity is preferable. Lithium sulfide can be produced, for example, by the method described in JP-H07-330312 A, JP-H09-283156 A, JP 2010-163356 A, and JP 2011-84438 A.

Examples of the compound containing phosphorus which may be contained in addition to elemental phosphorus include phosphorus sulfide such as diphosphorus trisulfide ($P_2S_3$) and diphosphorus pentasulfide ($P_2S_5$) and phosphorus compounds such as sodium phosphate ($Na_3PO_4$).

Examples of the compound or the single substance containing sulfur include, for example, $Li_2S$, elemental sulfur, $H_2S$, $P_2S_5$, $P_4S_3$, $PSBr_3$, $PSCl_3$, $SOCl_2$, $SF_2$, $SF_4$, $SF_6$, $S_2F_{10}$, $SCl_2$, $S_2Cl_2$, $S_2Br_2$. The compound or the single substance containing sulfur may be used in combination of two or more thereof.

In this aspect, since elemental phosphorus is used for all or a part of the phosphorus source, it is preferable to use elemental sulfur as a sulfur source in terms of ease of adjusting the composition.

Examples of the compound containing halogen include, for example, a compound represented by the general formula ($M_l$-$X_m$).

In the formula, M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a substance to which an elemental oxygen or an elemental sulfur is bonded with the listed element. M is preferably Li or P, and more preferably Li.

X is a halogen element selected from the group consisting of F, Cl, Br, and I. In addition, I is an integer of 1 or 2, and m is an integer of 1 to 10. When m is an integer of 2 to 10, that is, when a plurality of X's are present, X's may be the same or different. For example, in the case of $SiBrCl_3$ mentioned later, m is 4, and X's are different elements, i.e. Br and Cl.

Examples of the halogen compound represented by the above-mentioned formula include sodium halide such as NaI, NaF, NaCl, and NaBr; lithium halide such as LiF, LiCl, LiBr, and LiI; boron halide such as $BCl_3$, $BBr_3$, and $BI_3$; aluminum halide such as $AlF_3$, $AlBr_3$, $AlI_3$, and $AlCl_3$; silicon halide such as $SiF_4$, $SiCl_4$, $SiCl_3$, $Si_2Cl_6$, $SiBr_4$, $SiBrCl_3$, $SiBr_2Cl_2$, and $Si_4$; phosphorus halide such as $PF_3$, $PF_5$, $PCl_3$, $PCl_5$, $POCl_3$, $PSCl_3$, $PBr_3$, $PSBr_3$, $PBr_5$, $POBr_3$, $PI_3$, $PS_3$, $P_2Cl_4$, and $P_2I_4$; sulfur halide such as $SF_2$, $SF_4$, $SF_6$, $S_2F_{10}$, $SCl_2$, $S_2Cl_2$, and $S_2Br_2$; germanium halide such as $GeF_4$, $GeCl_4$, $GeBr_4$, $GeI_4$, $GeF_2$, $GeCl_2$, $GeBr_2$, and $GeI_2$; arsenic halide such as $AsF_3$, $AsCl_3$, $AsBr_3$, $AsI_3$, and $AsF_5$; selenium halide such as $SeF_4$, $SeF_6$, $SeCl_2$, $SeCl_4$, $Se_2Br_2$, and $SeBr_4$; tin halide such as $SnF_4$, $SnCl_4$, $SnBr_4$, $SnI_4$, $SnF_2$, $SnCl_2$, $SnBr_2$, and $SnI_2$; antimony halide such as $SbF_3$, $SbCl_3$, $SbBr_3$, $Sb_3$, $SbF_5$, and $SbCl_5$; tellurium halide such as $TeF_4$, $Te_2F_{10}$, $TeF_6$, $TeCl_2$, $TeCl_4$, $TeBr_2$, $TeBr_4$, and $TeI_4$; lead halide such as $PbF_4$, $PbCl_4$, $PbF_2$, $PbCl_2$, $PbBr_2$, and $Pb_2$; bismuth halide such as $BiF_3$, $BiCl_3$, $BiBr_3$, and $BiI_3$.

Among these, lithium halide or phosphorus halide is preferable, and LiCl, LiBr, LiI or $PBr_3$ is more preferable, LiCl, LiBr or LiI is still more preferable, and LiCl or LiBr is particularly preferable.

One of the kinds of halogen compounds described above may be used alone, or a combination of two or more kinds may be used.

A single substance of halogen such as chlorine ($Cl_2$) and bromine ($Br_2$) may also be used.

When halogen element is Cl and Br, for example, it is preferable that the raw material satisfy the composition represented by the following formula (1).

$$Li_aPS_bCl_{c1}Br_{c2} \quad (1)$$

In the formula (1), a, b, c1, and c2 satisfy the following formulas (A) to (C).

$$5.0 \leq a \leq 6.5 \quad (A)$$

$$6.1 \leq a+c1+c2 \leq 7.5 \quad (B)$$

$$0.5 \leq a-b \leq 1.5 \quad (C)$$

In the formula, b>0 and c1+c2>1.0.

The above formula (A) is preferably $5.1 \leq a \leq 6.4$, and particularly preferably $5.2 \leq a \leq 6.3$.

The above formula (B) is preferably $6.2 \leq a+c1+c2 \leq 7.4$, and particularly preferably $6.3 \leq a+c1+c2 \leq 7.3$.

The above formula (C) is preferably $0.6 \leq a-b \leq 1.3$, particularly preferably $0.7 \leq a-b \leq 1.3$.

In the present application, the molar ratio and the composition of each element in an argyrodite-type solid electrolyte are derived from the mixing ratio of the weighed raw materials. In the present application, the molar ratio in the raw material and the molar ratio of the argyrodite-type solid electrolyte which is the product are substantially equal. In the method for producing of this aspect, since the compositional deviation in the producing process can be suppressed, the deviation between the molar ratio of each element of the raw material and the molar ratio of the argyrodite-type solid electrolyte is small.

The molar ratio and the composition of each element in the argyrodite-type solid electrolyte can be measured by ICP-emission spectrometry.

The above-mentioned compound and the simple substance can be used without any particular limitation as long as they are industrially manufactured and sold. It is preferable that the compound and the simple substance have a high purity.

In the method for producing of this aspect, a raw material containing elemental phosphorus is mixed at an integrated power of 0.5 kwh/kg or more to obtain a precursor. In one embodiment, it is preferable to form a $P_2S_6^{4-}$ glass by sufficiently mixing a raw material containing a plurality of compounds or single substances. As described in Patent Document 4, $P_2S_6^{4-}$ crystal has significantly lower ionic conductivity compared to $P_2S_6^{4-}$ glass. Thus, it is generally considered undesirable to contain a $P_2S_6^{4-}$ glass as a precursor for a crystalline solid electrolyte. However, in this aspect, by reacting the raw material to the extent that $P_2S_6^{4-}$ glass generates, it is possible to obtain an argyrodite-type solid electrolyte with high ionic conductivity by subsequent heat treatment.

The mixing of the raw material is carried out so that the vitrification reaction proceeds by applying mechanical stress to the raw material. When the mixing of the raw material is insufficient, the ionic conductivity of the finally obtained argyrodite-type solid electrolyte is not sufficiently improved. Herein, "applying mechanical stress" is to mechanically apply shear stress, impact force, or the like. Examples of the means for applying mechanical stress include a pulverizer such as a ball mill, a beads mill, a vibration mill and a rolling mill, and a kneader, or the like. When applying mechanical stress, the raw material may be warmed to accelerate the reaction.

The inclusion of $P_2S_6^{4-}$ glass in the precursor can be verified, for example, by the presence or absence of peaks derived from $P_2S_6^{4-}$ glass observed in solid $^{31}$P-NMR measurement. The peak top derived from $P_2S_6^{4-}$ glass is observed around 102 to 108 ppm of solid $^{31}$P-NMR spectrum.

If it is not possible to determine whether a peak exists at a predetermined position from the solid $^{31}$P-NMR spectrum, the solid $^{31}$P-NMR spectrum is peak-separated by a nonlinear least squares method, and it is confirmed whether the peak exists at a predetermined position.

For the identification of separated peaks, for example, H. Eckert, Z. Zhang, and H. Kennedy, Chem. Mater. See Vol 2, No. 3, 273 (1990) can be referred.

In the method for producing of this aspect, in solid $^{31}$P-NMR measurement of the precursor, it is preferable that the maximum peak intensity of the peaks observed in the range of 30 to 60 ppm is smaller than the peak intensity of $P_2S_6^{4-}$ glass. Thus, the raw material is sufficiently mixed and reacted, it can be confirmed that $P_2S_6^{4-}$ glass is formed in the precursor. Consequently, the ionic conductivity of the finally obtained argyrodite-type solid electrolyte is further improved. The peaks observed in the range of 30 to 60 ppm are considered to be derived from unreacted raw materials.

In addition to $P_2S_6^{4-}$ glass, the precursor may also contain $P_2S_7^{4-}$ glass or $PS_4^{3-}$ glass. The inclusion of $P_2S_7^{4-}$ glass or $PS_4^{3-}$ glass in the precursor can be verified, for example, by the presence or absence of peaks derived from each glass observed in solid $^{31}$P-NMR measurement. The peak top derived from $P_2S_7^{4-}$ glass is observed around 91.4 ppm of solid $^{31}$P-NMR spectrum. The peak top derived from $PS_4^{3-}$ glass is observed around 82.5 to 84.5 ppm. The formed glass may be crystallized by heat if the raw material is heated during the application of mechanical stress. In this instance, for example, the formed glass may contain $PS_4^{3-}$ crystal. The peak top derived from $PS_4^{3-}$ crystal is observed around 86 to 87 ppm.

Further, among the peaks observed in the range of 30 to 120 ppm in solid $^{31}$P-NMR measurement of the precursor, it is preferred that the peak intensity of $P_2S_6^{4-}$ glass or $PS_4^{3-}$ glass be the largest. As a result, it can be confirmed that the ratio of $P_2S_6^{4-}$ glass or $PS_4^{3-}$ glass in the precursor is high. Consequently, the ionic conductivity of the finally obtained argyrodite-type solid electrolyte is further improved. If the raw material is heated during the application of mechanical stress, it is preferable that the peak intensity of $P_2S^{4-}$ glass, $PS_4^{3-}$ glass or $PS_4^{3-}$ crystal be the largest among the peaks observed in the range of 30 to 120 ppm in solid $^{31}$P-NMR measurement of the precursor.

In the present application, a "peak intensity" means the distance (height) from the baseline to the peak top of the NMR spectrum obtained by solid $^{31}$P-NMR measurement.

Confirmation of the formation of the precursor may be by the weight loss ratio in thermogravimetry instead of solid $^{31}$P-NMR measurement. The high weight loss ratio indicates that the vitrification of the raw material is insufficient, and the ionic conductivity of the resulting argyrodite-type solid electrolyte tends to be low. In this aspect, the weight loss ratio of the precursor at 600° C. is preferably 1.5% or less, more preferably 1.0% or less.

The mixing condition of the raw material needs to be appropriately set depending on the apparatus used for mixing. For example, when using a planetary ball mill, by adjusting grinding media, a rotational speed, a processing time, and a processing temperature or the like, the amount of energy given to the raw material (integrated power: kWh/kg) may be controlled. The integrated power is 0.5 kWh/kg or more and preferably 1.0 kWh/kg or more. Further, the integrated power is, for example, 20 kWh/kg or less, preferably 10 kWh/kg or less.

In the case when the electrical power consumption is known, the integrated power can be obtained by dividing an electrical power amount by the mass of the sample. The electrical power amount can be obtained by subtracting the electrical power when the ball mill is rotated without feeding the sample from the electrical power during ball mill operation. In the case when the electrical power consumption is not known, the kinetic energy is calculated on the assumption that the kinetic energy obtained from the revolution radius, the number of revolutions, the self-revolution ratio, the mass and the number of balls, etc. of the ball mill is applied to the sample.

The energy given to the raw material (power: kW/kg) need to be appropriately set in consideration of the processing apparatus and processing time. The energy is preferably 0.1 kW/kg or more, more preferably 0.3 kW/kg or more. Further, the energy is preferably 7 kW/kg or less, and more preferably 10 kW/kg or less.

The shorter the processing time is preferable, and the processing time is usually 10 minutes or more and 10 hours or less.

An argyrodite-type solid electrolyte is produced by heat-treating and crystallizing precursors obtained by mixing raw materials. The heat treatment temperature is 350 to 500° C., more preferably 360 to 500° C., and still more preferably 380 to 450° C.

The treatment time is adjusted by temperature, and is usually 0.5 to 12 hours, and is preferably 1 to 8 hours.

The atmosphere of the heat treatment is not particularly limited, and is preferably under atmospheric pressure and an inert gas atmosphere such as nitrogen and argon.

The fact that the solid electrolyte obtained in this aspect is an argyrodite-type solid electrolyte can be confirmed, for example, by having diffraction peaks at $2\theta=25.2\pm0.5$ deg and $29.7\pm0.5$ deg in powder X-ray diffraction measurement using CuKα rays. These diffracted peaks are those derived from an argyrodite-type crystal structure.

Diffraction peaks of the argyrodite-type crystal structure may appear, for example, at 2θ=15.30.5 deg, 17.7±0.5 deg, 31.1±0.5 deg, 44.9±0.5 deg, and 47.7±0.5 deg. The solid electrolyte obtained in this aspect may have these peaks.

The solid electrolyte obtained in this aspect contains a lithium element, a phosphorus element and a sulfur element, and an optional halogen element. In addition to these elements, elements such as Si, Ge, Sn, Pb, B, Al, Ga, As, Sb, and Bi may be contained. Further, a chalcogen element (oxygen (O), selenium (Se), tellurium (Te), or the like) may be contained. In this aspect, it is preferable that a lithium element, a phosphorus element, a sulfur element, and at least one halogen element of chlorine and bromine.

According to this aspect, an argyrodite-type solid electrolyte having high ionic conductivity can be obtained even if diphosphorus pentasulfide is not used as a raw material. For example, an argyrodite-type solid electrolyte having an ionic conductivity of 9 mS/cm or more or 11 mS/cm or more can be obtained. The argyrodite-type solid electrolyte obtained according to this aspect is suitable as a material for constituting a lithium-ion battery, such as a solid electrolyte layer.

Another aspect of the invention contains steps of mixing a raw material containing a phosphorus element to obtain a precursor containing $P_2S_6^{4-}$ glass and heat-treating the resulting precursor at 350 to 500° C. This method is the same as the method described above, except that a precursor containing $P_2S_6^{4-}$ glass is obtained. The Precursor containing $P_2S_6^{4-}$ glass is obtained, for example, by sufficiently mixing the raw material in the same manner as the producing method of the above-described aspect.

EXAMPLES

The present invention is described below in more detail by Examples.

The evaluation method is as follows.
(1) Ionic Conductivity Measurement

The solid electrolyte prepared in each Example was filled in a tablet molding machine and a pressure of 407 MPa (press indication value 22 MPa) was applied by using a mini press machine to obtain a molded body. Carbon was placed on both sides of the molded body as an electrode, and pressure was applied again by a tablet molding machine, whereby a molded body for measurement (diameter: about 10 mm, thickness: 0.1 to 0.2 cm) was produced. The ionic conductivity of this molded body was measured by AC impedance measurement. The value of ionic conductivity was adopted the value at 25° C.

(2) Solid $^{31}$P-NMR Measurement

Peak Intensity

Approximately 60 mg of the powder sample was loaded into an NMR-sample tube and a solid $^{31}$P-NMR spectrum was obtained using the apparatus and conditions described below.

Apparatus: ECZ400R (manufactured by JEOL Ltd.)
Observation nucleus: $^{31}$p
Observation frequency: 161.944 MHz
Measurement temperature: Room temperature
Pulse sequence: Single pulse (using 90 pulse)
900 pulse width: 3.8μ
Waiting time after FID measurement until the next pulse application: 300 s
Rotational speed of magic angle rotation: 12 kHz
Number of integrations: 16 times
Measurement range: 250 ppm to −150 ppm Chemical Shift: obtained by using $(NH_4)_2HPO_4$ as an external reference (Chemical Shift 1.33 ppm).

The height from the baseline of each peak observed in the obtained solid $^{31}$P-NMR spectrum was taken as the peak intensity.

Peak separation

When peak separation is performed, the resulting solid $^{31}$P-NMR spectrum is analyzed using software "FT-NMR" (software contained in the revised version (second edition) of "Data Processing of FT-NMR by PC" (SANKYO SHUPPAN Co., Ltd.)) to determine separation peaks.

The software calculates separated peaks, the calculated value of the NMR signal, and the residual sum of squares R2 from the NMR signal using the nonlinear least squares method. Peak separation is completed when the residual sum of squares R2 within the analysis range of the experimental value and the calculated value is 0.007 or less and the smallest number of separated peaks is obtained when the maximum peak height is 1.

(3) Thermogravimetry

Thermogravimetry was performed using a Differential Thermal-Thermogravimetry (TGA/DSC1, manufactured by Mettler-Toledo International Inc.) at room temperature (20° C.) to 600° C. in a dry nitrogen atmosphere at a temperature rise rate of 10° C./min. The sample was approximately 20 mg. The weight loss ratio at 600° C. relative to the weight at room temperature was measured.

(4) X-Ray Diffraction (XRD) Measurement

A circular pellet having a diameter of 10 mm and a height of 0.1 to 0.3 cm was molded from the solid electrolyte produced in each Example to obtain a sample. The sample was measured without exposure to air using an XRD airtight holder. The 2θ position of the diffraction peak was determined by the centroid method using an XRD analysis program JADE.

Measurement was conducted under the following conditions using a powder X-ray diffractometer SmartLab manufactured by Rigaku Corporation.

Tube voltage: 45 kV
Tube current: 200 mA
X-ray wavelength: Cu-Kα ray (1.5418 Å)
Optical system: Parallel beam system
Slit configuration: solar slit 5°, incident slit: 1 mm, light receiving slit: 1 mm
Detector: Scintillation counter
Measurement range: 2θ=10 to 60 deg
Step width, scan speed: 0.02 deg, 1 deg/min Production Example 1

(Production of Lithium Sulfide ($Li_2S$))

In a 500 mL-separable flask equipped with a stirrer, 200 g of dried LiOH anhydride (manufactured by Honjo Chemical Co., Ltd.) was put under an inert gas. The temperature was raised under a stream of nitrogen, and the internal temperature was maintained at 200° C. Nitrogen gas was switched to hydrogen sulfide gas (Sumitomo Seika Co., Ltd.) at a flow rate of 500 mL/min, and LiOH anhydride and hydrogen sulfide were reacted.

Moisture generated by the reaction was condensed by a condenser and collected. The reaction was carried out for 6 hours at which time 144 mL of water was recovered. The reaction was continued for an additional 3 hours, but no moisture generation was observed.

The product powder was collected and measured for purity and XRD. As a result, the purity was 98.5%, and the peak pattern of Li$_2$S was confirmed by XRD.

Example 1

(1) Preparation of the Precursor

Lithium sulfide produced in Production Example 1 (purity 98.5%), red phosphorus (manufactured by Kojundo Chemical Lab. Co., Ltd.), sulfur (manufactured by Wako Pure Chemical Industries, Ltd.), lithium chloride (manufactured by Sigma-Aldrich Co. LLC, purity 99%) and lithium bromide (manufactured by Sigma-Aldrich Co. LLC, purity 99%) were used as raw materials (hereinafter, in all Examples, the purities of the respective starting materials are the same). The above compound and the simple substance were mixed so that the compositions of the whole raw material became Li$_{5.4}$PS$_{4.4}$Br$_{0.6}$Cl$_{1.0}$. Specifically, 0.447 g of lithium sulfide, 0.159 g of red phosphorus, 0.411 g of sulfur, 0.217 g of lithium chloride, and 0.267 g of lithium bromide were mixed.

The raw material and ten zirconia balls having diameters of 10 mm were placed in zirconia pot (45 mL) of a planetary rotating ball mill (Model No. LP-M2H, manufactured by Ito Seisakusho Co., Ltd.) and completely sealed. The inside of the pot was an argon atmosphere. The precursor was obtained by treating the raw material at 300 rpm in a ball mill at room temperature for 1 hour (integrated power: 1.0 kWh/kg). The power applied to the sample was calculated assuming that the kinetic energy of the ball was applied to the sample.

The solid $^{31}$P-NMR spectrum of the obtained precursor is shown in FIG. 1. Peaks of P$_2$S$_6^{4-}$ glass, P$_2$S$_7^{4-}$ glass, PS$_4^{3-}$ glass, and an unassigned peak (51 ppm) were observed. The peak intensity of the peak assigned to P$_2$S$_6^{4-}$ glass was confirmed to be larger than the maximum peak intensities of the unassigned peaks observed in the range of 30 to 60 ppm. Among the peaks observed in the range of 30 to 120 ppm, the largest was the peak of PS$_4^{3-}$ glass.

The weight loss ratio of the precursor was 1.0%.

(2) Crystallization

Approximately 1.5 g powder of the above precursor powder was packed into a Tamman tube (PT2, manufactured by Tokyo Glass Instruments Co., Ltd.) in a glove box under an argon atmosphere, and the opening of the Tamman tube was closed with quartz wool, and sealed with a sealed container made of SUS so that the air could not enter. The sealed container was then placed in an electric furnace (FUW243PA, manufactured by Advantech Toyo Kaisha, Ltd.) and heat treated. Specifically, the temperature was raised from room temperature to 430° C. at 2.5° C./min (raised to 430° C. in 3 hours), and held at 430° C. for 8 hours. Thereafter, the sealed container was slowly cooled to obtain an argyrodite-type solid electrolyte.

The ionic conductivity (a) of the solid electrolyte was 9.5 mS/cm.

Figure 2:
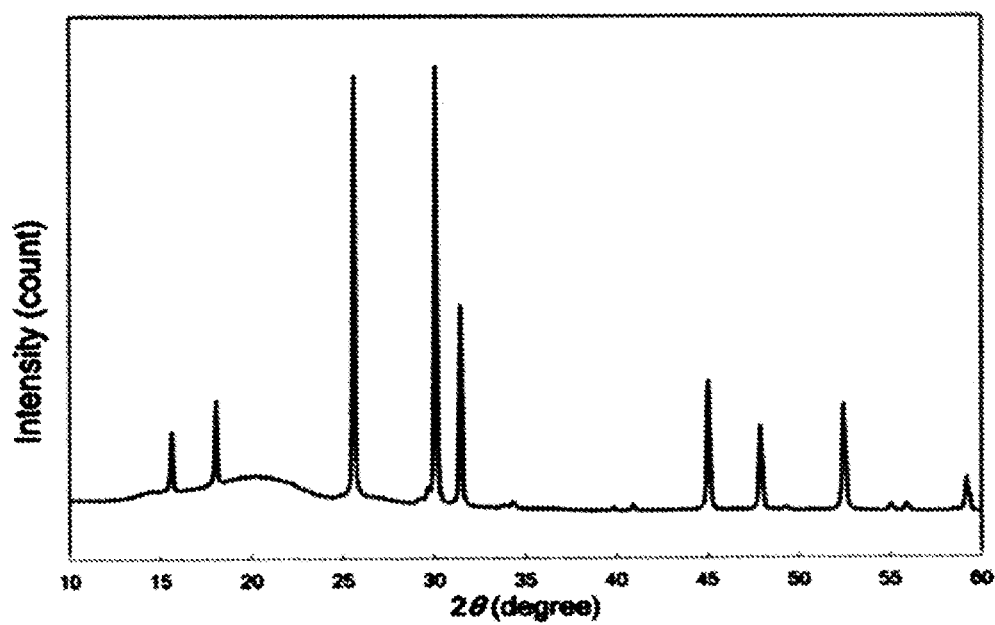
FIG. 2 shows the XRD-pattern of the argyrodite-type solid electrolyte obtained in Example 1.

The XRD pattern of an argyrodite-type solid electrolyte obtained in Example 1 is shown in FIG. 2. Peaks derived from an argyrodite-type crystal structure were observed in the XRD pattern.

Example 2

A precursor was prepared and crystallized to obtain an argyrodite-type solid electrolyte in the same manner as in Example 1, except that the treatment time by the ball mill was set to 4 hours (integrated power: 4.0 kWh/kg).

The solid $^{31}$P-NMR spectrum of the precursor is shown in FIG. 1. Peaks of P$_2$S$_6^{4-}$ glass, P$_2$S$_7^{4-}$ glass, and PS$_4^{3-}$ glass were observed. No unassigned peaks were observed in the range of 30 to 60 ppm. Among the peaks observed in the range of 30 to 120 ppm, the largest was the peak of PS$_4^{3-}$ glass. The weight loss ratio of the precursor was 0.9%.

The ionic conductivity (σ) of solid electrolyte was 11.2 mS/cm.

Figure 3:
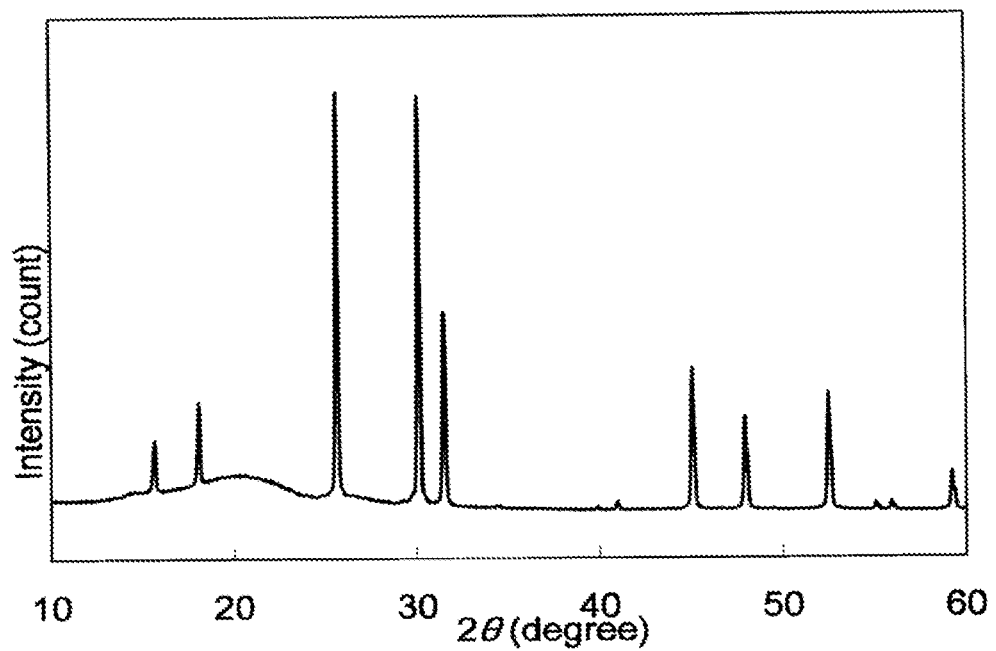
FIG. 3 shows the XRD-pattern of the argyrodite-type solid electrolyte obtained in Example 2.

The XRD pattern of the argyrodite-type solid electrolyte obtained in Example 2 is shown in FIG. 3. Peaks derived from argyrodite-type crystal structure were observed in the XRD pattern.

Comparative Example 1

A precursor was prepared and crystallized to obtain a solid electrolyte in the same manner as in Example 1, except that the treatment time by the ball mill was set to 6 minutes (integrated power: 0.1 kWh/kg).

The solid $^{31}$P-NMR spectrum of the precursor is shown in FIG. 1. Peaks of P$_2$S$_7^{4-}$ glass, PS$_4^{3-}$ glass, and an unassigned peak (51 ppm) were observed. No peaks assigned to P$_2$S$_6^{4-}$ glass were observed.

The weight loss ratio of the precursor was 3.0%.

The ionic conductivity (a) of the solid electrolyte was 7.3 mS/cm. As a result of the XRD measurement, peaks derived from an argyrodite-type crystal structure were observed.

Comparative Example 2

Figure 4:
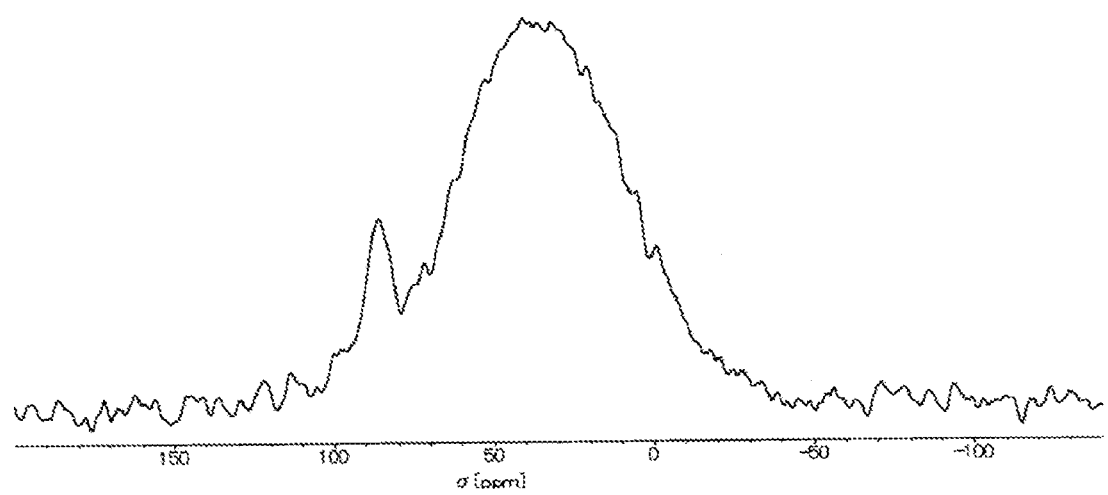
FIG. 4 shows the solid $^{31}$P-NMR spectrum of the raw material used in Comparative Example 2.

The raw material blended in the same manner as in Example 1 was mixed for 10 minutes in an agate mortar without treatment by the ball mill. The solid $^{31}$P-NMR spectrum of the raw material after mixing is shown in FIG. 4. Unsigned peaks (35.2 ppm, 86.8 ppm) were observed. No peaks assigned to P$_2$S$_6^{4-}$ glass were observed. The weight loss ratio of the raw material was 4.0%.

Example 3

A precursor was prepared and crystallized to obtain a solid electrolyte in the same manner as in Example 1, except that the treatment temperature by the ball mill was changed from room temperature to 200° C.

As a result of the solid $^{31}$P-NMR measurement, no unsigned peaks were observed in the range of 30 to 60 ppm, and peaks of P$_2$S$_6^{4-}$ glass and PS$_4^{3-}$ crystal were observed. Among the peaks observed in the range of 30 to 120 ppm, the largest was the peak of PS$_4^{3-}$ crystal. The weight loss ratio of the precursor was 0.7%.

The ionic conductivity of the solid electrolyte was 11.0 mS/cm. As a result of the XRD measurement, peaks derived from an argyrodite-type crystal structure were observed.

Example 4

A precursor was prepared and crystallized to obtain a solid electrolyte in the same manner as in Example 2, except that red phosphorus was changed to yellow phosphorus. Yellow phosphorus was obtained as follows.

1 g of red phosphorus (purity: 99.999%, manufactured by Kojundo Chemical Lab. Co., Ltd.) was placed in a quartz tube sealed on one side and the interior was evacuated by a rotary pump to seal the other side. The side of quartz tube containing red phosphorus was heated to 430° C. in an annular furnace to sublimate red phosphorus and allow it to condense as yellow phosphorus on the side kept at room temperature. After cooling sufficiently, waxy yellow phosphorus was collected in a glove box under an argon atmosphere.

The weight loss ratio of the obtained precursor was 0.2%. The ionic conductivity of the solid electrolyte was 12.2 mS/cm. Peaks derived from an argyrodite-type crystal structure were observed in XRD.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method for producing a sulfide solid electrolyte having an argyrodite crystal structure, the method comprising:
    mixing a raw material comprising elemental phosphorus at an integrated power of 0.5 kWh/kg or more; and
    heat-treating a precursor obtained in the mixing at a temperature in a range of from 350 to 500° C.

2. The method of claim 1, wherein the integrated power in the mixing of the raw material is in a range of from 0.5 to 20 kWh/kg.

3. The method of claim 1, wherein the raw material further comprises elemental sulfur.

4. The method of claim 1, wherein the raw material further comprises
    lithium and
    chlorine and/or bromine.

5. The method of claim 1, wherein the precursor comprises $P_2S_6^{4-}$ glass.

6. The method of claim 5, wherein, in a solid $^{31}$P-NMR measurement of the precursor, a peak intensity of peaks observed in a range of from 30 to 60 ppm is less than a peak intensity of the $P_2S_6^{4-}$ glass.

7. The method of claim 5, wherein the precursor further comprises $P_2S_7^{4-}$ glass.

8. The method of claim 5, wherein, in a solid $^{31}$P-NMR measurement of the precursor, a peak intensity of $P_2S_6^{4-}$ glass or $PS_4^{3-}$ glass is the largest among the peaks observed in a range of from 30 to 120 ppm.

9. The method of claim 1, wherein the heat-treating is carried out under atmospheric pressure and in an inert atmosphere.

10. A method for producing a sulfide solid electrolyte having an argyrodite crystal structure, the method comprising:
    mixing a raw material comprising elemental phosphorus, to obtain a precursor comprising $P_2S_6^{4-}$ glass; and
    heat-treating the precursor at a temperature of from 350 to 500° C.

11. The method of claim 1, wherein a weight loss ratio of the precursor at 600° C. in thermogravimetry is 1.5% or less.

12. The method of claim 5, wherein the precursor further comprises $PS_4^{3-}$ glass.

13. The method of claim 1, wherein the temperature of the heat-treating is at least 360° C.

14. The method of claim 1, wherein the temperature of the heat-treating is in a range of from 380 to 450° C.

15. The method of claim 1, wherein the heat-treating is conducted for a tinge in a range of from 0.5 to 12 hours.

16. The method of claim 1, wherein the heat-treating is conducted for a time in a range of from 1 to 8 hours.

17. The method of claim 1, wherein the integrated power in the mixing of the raw material is in a range of from 1 to 10 kWh/kg.

18. The method of claim 17, wherein the integrated power is no more than 7 kWh/kg, and
    wherein the mixing is conducted for a mixing time in a range of from 10 minutes to 10 hours.

* * * * *